April 10, 1962 P. W. STRIDER 3,029,301
COMBINATION OF 6 VOLT AND 12 VOLT BATTERY
Original Filed Sept. 6, 1957 2 Sheets-Sheet 1
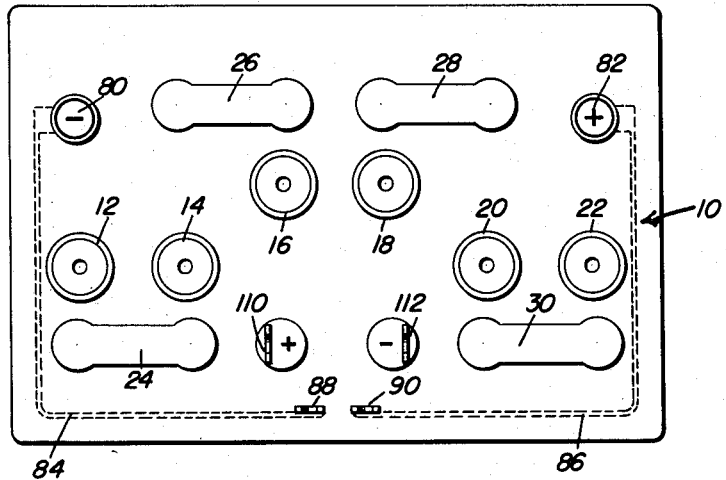
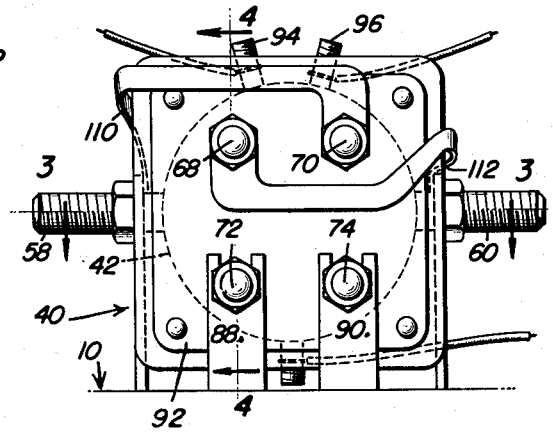
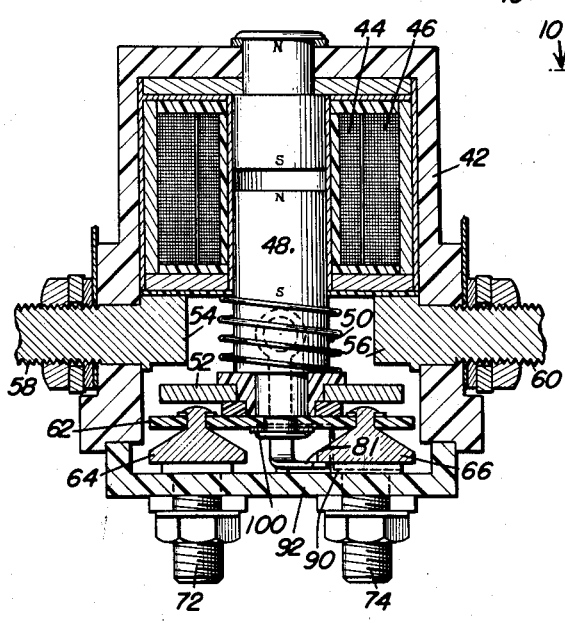
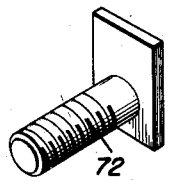
Pierce W. Strider
INVENTOR.
BY *Clarence A. O'Brien*
and *Harvey B. Jacobson*
Attorneys April 10, 1962 P. W. STRIDER 3,029,301
COMBINATION OF 6 VOLT AND 12 VOLT BATTERY
Original Filed Sept. 6, 1957 2 Sheets-Sheet 2
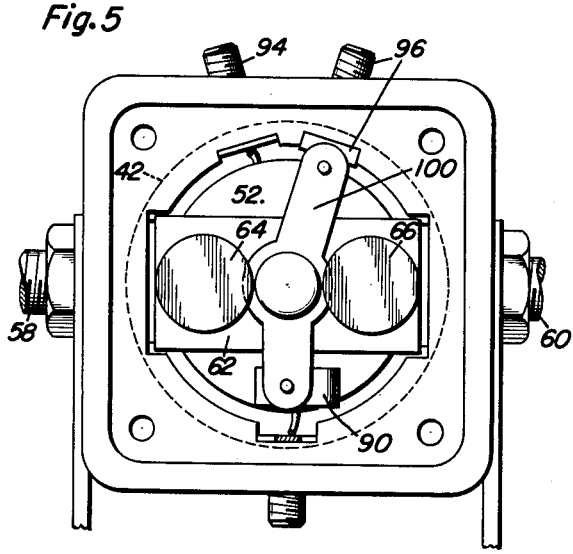
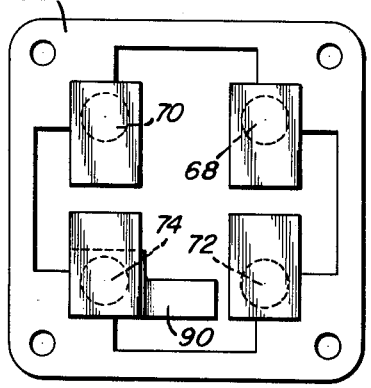
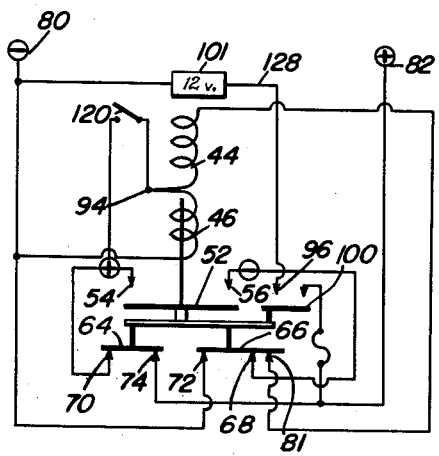
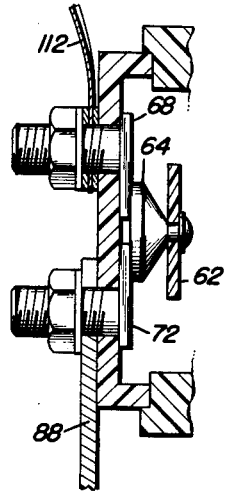
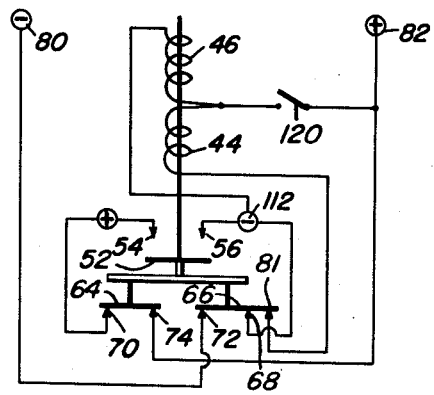
Pierce W. Strider
INVENTOR.

United States Patent Office 3,029,301
Patented Apr. 10, 1962

3,029,301
COMBINATION OF 6 VOLT AND 12 VOLT BATTERY
Pierce W. Strider, P.O. Box 224, Goldsboro, N.C.
Continuation of application Ser. No. 682,518, Sept. 6, 1957. This application Aug. 18, 1959, Ser. No. 836,318
4 Claims. (Cl. 136—181)

This invention relates to battery constructions and more particularly to a novel combination 6 volt and 12 volt battery. This application is a continuation of application, Serial No. 682,518, filed Sept. 6, 1957, now abandoned.

The primary object of the present invention resides in the provision of a battery so constructed and arranged that it is capable of being used as a 12 volt battery though while standing unused it is connected as a 6 volt battery.

A further object of the present invention resides in the provision of a combination 6 volt and a 12 volt automobile battery especially adapted for use on 6 volt cars where it is desirable to have 12 volt electromotive force for starting or operating other 12 volt equipment.

A further object of the present invention resides in the provision of a battery constructed and adapted for use on automobiles having 12 volt electrical systems when it is desired to operate some 6 volt equipment. The concept of this invention lies in the provision of a battery constructed in combination with a relay so that when the starter switch or other activator is actuated, the sets of three cells each of the battery are connected in series connection rather than in parallel connection. This results in the provision of 12 volt power for starting or for operating other 12 volt equipment yet when the battery is at rest, there is only a 6 volt potential which will extend the life of the battery due to the fact that there will be reduced leakage or across the case of the battery normally occurring where dust, dirt, grease, oil, water, or the like collecting on the surface of the battery.

Still further objects and features of the invention reside in the provision of a combination 6 volt and 12 volt battery which is simple in construction, efficient in use, and capable of being employed to adapt automobiles for use with any desired equipment.

These, together with various ancillary objects and features of the invention which will become apparent as the following description proceeds, are attained by this combination 6 volt and 12 volt battery, preferred embodiments and circuit arrangements being shown in the accompanying drawings, by way of example only, wherein:

FIGURE 1 is a plan view of a battery constructed in accordance with the invention;

FIGURE 2 is a front elevational view of the relay forming an important part of the invention;

FIGURE 3 is a horizontal sectional detail view as taken along the plane of line 3—3 in FIGURE 2;

FIGURE 4 is a vertical sectional view along the plane of line 4—4 in FIGURE 2;

FIGURE 5 is a front elevational view of the relay with the cover removed therefrom;

FIGURE 6 is an elevational view of the inside of the cover;

FIGURE 7 is a perspective view of one of the contact elements;

FIGURE 8 is a schematic wiring diagram of the invention for a vehicle employing a 6 volt electrical system using some 12 volt electrical equipment; and FIGURE 9 is a schematic wiring diagram of a modified circuit employed for a vehicle having a 12 volt electrical system using some 6 volt electrical equipment.

With continuing reference to the accompanying drawings, wherein like reference numerals designate similar parts throughout the various views, reference numeral 10 generally designates a battery constructed in accordance with the concepts of the present invention. As shown in FIGURE 1, the battery 10 comprises a plurality of cells each of which is provided with filler caps as indicated at 12, 14, 16, 18, 20, and 22. The cells will hereinafter be designated by the reference numerals directed to the filler caps and it is noted that cells 12 and 14 are connected in series by means of strap 24. Cells 14 and 16 are interconnected by strap 26 thus connecting cells 12, 14, and 16 in series for production of 6 volts, more or less. Cells 18 and 20 are interconnected by strap 28 while cells 20 and 22 are interconnected by strap 30 all in series whereby cells 18, 20 and 22 are adapted to produce 6 volts, more or less. It is the concept of the present invention to provide means for alternatively connecting the set of cells 12, 14 and 16 with the set of cells 18, 20 and 22, either in parallel connection whereby the output of the battery will be 6 volts at 2 plus amps. or in series wherein the operator of the battery will be 12 volts at 1 plus amperage.

In carrying out the invention a relay generally designated by the reference numeral 40 is employed. The relay 40 includes a housing 42 of any suitable material which is comparatively light in weight and which has mounted therein an operating coil 44 and surrounding the operating coal a holding coil 46. The relay of course is provided with an armature 48 which is normally urged by means of spring 50 to a retracted position and when engaged the contact plate 52 will engage the contact surfaces 54 and 56 of terminals 58 and 60. The armature further carries an insulative plate 62 to which bridging contacts 64 and 66 are attached which are adapted to bridge the four contact terminals 68, 70, 72 and 74 in the deenergized condition of the relay.

Connected to the electrodes 80 and 82 of cells 12 and 22, respectively, are conductor straps 84 and 86 which are embedded in the battery and which are connected to posts 88 and 90 rising upwardly from the cells 16 and 18 which posts are of electrically conductive material and which are connected to terminals 72 and 74.

The strap 86 is also electrically connected to substantially Z-shaped strip 90 affixed to the cover 92 of the relay and adapted to be bridged by bridging contact 66. The relay is provided with further contact terminals 94 and 96. The contact 94 is connected to the operating coil 44 while the contact 96 is adapted to be engaged by the member 100 that is connected to the electrode 80 through 12 volt equipment 101.

The terminal 58 is connected to the electrode 110 of the cell 16 while the terminal 60 is connected to the electrode 112 of the cell 18.

The terminal 72 is connected to the electrode 80 while the terminal 74 is connected to the electrode 82. In operation, when a remotely located switch such as the ignition switch 120 is closed, it will energize the operating coil 44 causing the contact disk 52 to become engaged with the contacts as at 54 and 56 and to disengage the bridging contacts 64 and 66 from bridging the terminals 68, 74 and 72, 70 and 81 respectively. The disengaging of the contacts 66 and 81 will cause the operating coil 44 to be deenergized. The bridging of the contacts 54 and 56 will connect the sets of cells in the series connections to provide 12 volt power. The holding coil 46 will remain energized until the switch 120 is opened at which time the system will be returned to its initial state.

In the form of the invention as shown in the wiring diagram of FIGURE 9, the holding coil 46 serves to hold the relay in the series position with a minimum of current consumption and is adapted to provide 12 volt electrical power to the automobile except when the vehicle is not in use and the relay is permitted to return to its initial state where the sets of cells are connected in parallel.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

I claim:

1. A battery construction comprising a plurality of electrolytic cells, said cells being arranged in a pair of sets, the cells of each set being connected in series connection, a relay interconnecting said sets, said relay having a first set of contacts and electromagnetic means connecting said pair of sets automatically in series connection, and said relay having a second set of contacts and electromagnetic means automatically connecting said pair of sets in parallel connection.

2. A battery construction comprising a plurality of electrolytic cells, said cells being arranged in a pair of sets, the cells of each set being connected in series connection, a relay switch detachably mounted on and externally of the battery, said relay switch interconnecting said sets, a first and a second set of contacts in the relay switch connecting said pair of sets in series connection and said pair of sets in parallel connection, respectively, and a pair of coils and electromagnetically operated means in the relay switch for automatically selectively actuating the first and second set of contacts for series or parallel connection.

3. A battery construction comprising a plurality of electrolytic cells, said cells being arranged in at least a pair of sets, the cells of each set being connected in series connection, a relay switch detachably mounted on the battery and externally thereof interconnecting said sets selectively in series and in parallel connection, an armature in the switch having means thereon for automatically connecting said sets in series or parallel connection, and a pair of coils for electromagnetically urging the armature selectively to series or parallel connection.

4. A battery construction comprising a plurality of electrolytic cells, said cells being arranged in a pair of sets, the cells of each set being connected in series connection, a relay switch detachably mounted externally of the battery and interconnecting said sets, said relay switch having a first set of contacts connecting said pair of sets in series connection, said relay having a second set of contacts connecting said pair of sets in parallel connection, and switch means connected to said relay switch and said sets of cells for actuating said relay switch, said relay including a holding coil for holding said relay in an actuated position with said sets of cells being connected in series connection after which said switch has actuated said relay, and an operating coil for retaining a parallel connection upon release of the series connection.

References Cited in the file of this patent

UNITED STATES PATENTS

| | | |
|---|---|---|
| 650,119 | Wade | May 22, 1900 |
| 1,924,959 | Patterson | Aug. 29, 1933 |
| 2,335,526 | Mitchell | Nov. 30, 1943 |